B. BLOCK.
PROCESS OF EVAPORATING SOLUTIONS IN WHICH SALT IS PRECIPITATED.
APPLICATION FILED DEC. 6, 1909.
1,006,823.
Patented Oct. 24, 1911.
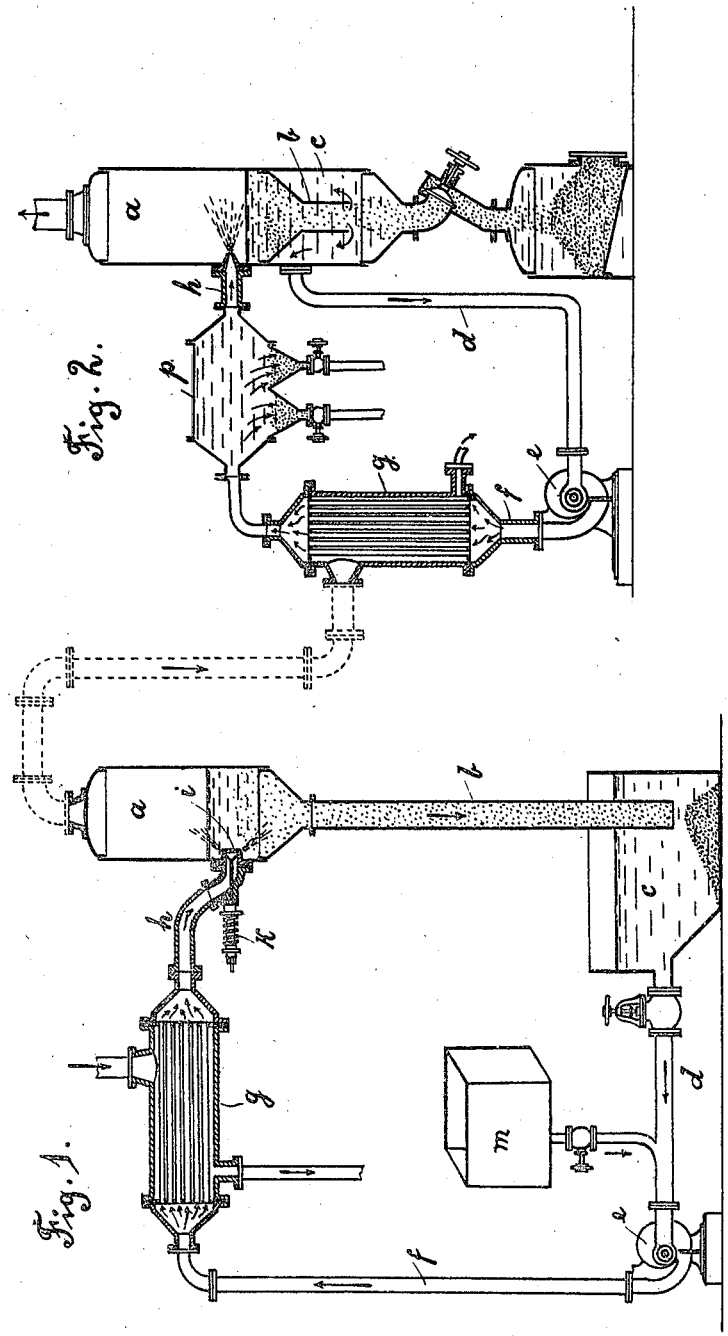

UNITED STATES PATENT OFFICE.

BERTHOLD BLOCK, OF ERFURT, GERMANY.

PROCESS OF EVAPORATING SOLUTIONS IN WHICH SALT IS PRECIPITATED.

1,006,823.

Specification of Letters Patent.  Patented Oct. 24, 1911.

Application filed December 6, 1909. Serial No. 531,683.

*To all whom it may concern:*

Be it known that I, BERTHOLD BLOCK, engineer, a citizen of the Empire of Germany, residing at 1 Bismarckstrasse, Erfurt, in said Empire of Germany, have invented a certain new and useful Improved Process of Evaporating Solutions in which Salt is Precipitated, of which the following is a specification.

The subject-matter of my invention is a process of evaporating solutions in which salt is precipitated.

When evaporating solutions in which salts are precipitated as saturation increases the drawback is met with that the precipitated salts settle on the heating surfaces and thus prevent the transmission of heat. This incrustation on the heating surface is almost entirely obviated by preventing evaporation on the same and the concentration occasioned thereby, and by heating the solution here only slightly above the boiling point. The heated solution is then supplied to an evaporator which is at a lower pressure than the heater, so that the superflous heat is liberated and evaporates a portion of the liquid. The salts precipitated in consequence of the evaporation and concentration may be collected in various ways without their contacting with the heating surface.

Some constructional forms of apparatus for carrying my process into practice are shown diagrammatically and by way of example in the accompanying drawing wherein:

Figure 1 is an elevation partly in section showing one form, and Fig. 2 a like view showing a modified form.

Referring to the drawing, $a$ designates an ordinary evaporator in which the salt is precipitated and falls in known manner with the solution through the descending pipe $b$ into the salt separator $c$. In consequence of the large cross-sectional area of the salt separator the solution moves so slowly therein that the salt has time to settle. The salt can then be removed from the tank $c$ manually or by mechanical conveyers. A pump $e$ lifts the solution liberated from salt through pipe $d$ from tank $c$ and forces it through the ascending pipe $f$ into the heating apparatus $g$. The solution is here heated by a heating medium, e. g. steam, to the required temperature in order to pass on through pipe $h$ into the evaporator $a$. In the evaporator is maintained in known manner by means described hereinafter a lower pressure than in the heating apparatus and connecting pipe $h$ so that the superheated solution is partially evaporated and salt precipitated. While a portion of the salt settles in the separator $c$ the brine is lifted by pump $e$ through pipe $d$ and the described cycle of operations is repeated, fresh solution being supplied from a receptacle $m$ arranged above and in communication with the pipe $d$ to the system. Consequently the solution is maintained in constant circulation by pump $e$ and by means of this pump the velocity in the heating tubes can be raised to so high a point that it is impossible for suspended admixtures to be deposited therein. This is not possible in the old evaporators which maintain their circulation only by means of the buoyancy of the hotter solution and the specifically lighter mixture of steam and solution in the ascending pipe, because this impelling force is very soon overcome by the necessary, great velocity of the solution and therefore sufficient velocity cannot be obtained. Since the resistances increase with the square of the velocity and since velocities of liquid of at least 0.8 meters per second come into consideration, which can not be produced by difference of buoyancy, incrustations can only be completely avoided by using a special pump which conveys the liquid with the necessary velocity through the tubes. For increasing the action, the pump pressure is so adjusted with the aid of the means described hereinafter that all boiling in the heater and ascending or connecting pipe is impossible.

The employment of pumps for moving solutions in evaporating apparatus is well-known, but in no case has the pump been used heretofore in evaporating apparatuses for the express purpose of producing a velocity of the liquid of over 0.8 meters per second, when it is impossible for suspended particles to settle, and for simultaneously producing such a pressure which prevents all evaporation in the heating system and the connecting pipe leading to the evaporator.

In order to avoid the above described drawbacks, namely evaporation in the ascending pipe $f$, pipe $h$ and in the heating apparatus $g$, I provide a pressure-regulating device $i$, $k$ which opposes such resistance to the outflow of solution that in the heating apparatus $g$ and pipe $h$ and also, obviously, in pipe *f* a pressure exists which renders evaporation here impossible. This excess pressure in pipe *h* and in the apparatus located farther back toward the pump may be regulated, for example, preferably by means of a valve. On the valve disk *i* there acts, on the one hand, the pressure in pipe *h* produced by the pump and, on the other hand, the pressure produced by an air-pump in the evaporator *a*. By adjusting the tension of spring *k* the valve allows solution to flow toward the evaporator *a* into the evaporator chamber only when there is a definite excess pressure in pipe *h*. This excess pressure determined by said spring is so regulated that the solution does not boil in the heater and its connecting pipe even when it is heated to the temperature of the heating medium.

For further explanation of the above I will assume that brine is to be evaporated in a vacuum evaporating apparatus for example, a boiling temperature of 80° C. being maintained by means of the action of the condenser with the air-pump in the evaporator, and the hot steam having a pressure of 1.5 atmospheres corresponding to a temperature of approximately 111° C. Now since saturated brine at 1 atmosphere pressure boils at 108° C., in this case care only has to be taken, by regulating valve *i*, that the brine remains at a pressure, of approximately 1.2 atmospheres in order certainly to avoid all boiling. Behind the valve disk *i*, thus in the evaporator *a*, the brine is relieved from pressure so that in consequence of the stored heat vigorous evaporation occurs at once in the evaporator. The precipitation of salt can here proceed undisturbed because there are arranged in the evaporator chamber no heaters which would be incrusted. In this manner all incrustation disturbing working is avoided in the connecting body under high pressure and in the heating system.

Instead of the above described spring valve one loaded with a weight, or a gate valve, or a throttling nozzle according to Fig. 2, or any other well-known device may be employed which is adapted to offer the resistance necessary for producing the required counter pressure to the solution continuously rapidly circulated by a pump or other mechanical apparatus. Owing to such a pressure regulating device in combination with the pump the position of the heating device is independent of that of the evaporator, since the excess pressure under which the solution must be in the heating device can be adjusted by the pump independently of this position. In contradistinction to the evaporators customary heretofore, the heating device can be placed with the same favorable result at the side of or above the evaporator, and this is frequently of great advantage, because high buildings admitting of the low position as required by the old arrangements are not always at disposal.

In former evaporating apparatuses the evaporation of sodium chlorid solutions containing gypsum was particularly difficult because, when starting to heat the same, the gypsum is partially precipitated in consequence of its peculiar solvent conditions, as is well-known, corresponding to the temperature and differs materially in its action in this respect from other salts: In 100 parts of water there are dissolved: at 18° C. 0.259 parts of gypsum, at 38° C. 0.272 parts of gypsum, at 72° C. 0.255 parts of gypsum, and at 90° C. 0.222 parts of gypsum. If such a solution, *e. g.* a natural brine, be heated from 18° to 38° C., the same would be able to dissolve more gypsum. When heated still higher, however, the solvent power lessens, so that at 72° C. the same quantity is no longer dissolved as at 18° C. When heated still higher the superfluous gypsum is at once precipitated because, *e. g.* at 90° C., 0.259—0.222=0.037 parts of gypsum can no longer be kept in solution. Such precipitations occur consequently, when evaporating salt solutions containing gypsum, in the heating apparatus *g*, and therefore it was not possible heretofore to free the dry salt obtained from gypsum if the gypsum was not precipitated by a special process before the evaporation of the salt solutions. My hereindescribed process of evaporating such solutions admits, however, of the inclusion in the system of a mud collector because in my process no evaporation and precipitation of salt take place until the solution reaches the evaporating chamber. For collecting the precipitated gypsum a wide vessel *p* (Fig. 2) is preferably included in the pipe *h* in order to diminish the velocity of the solution to such an extent that the gypsum is deposited. This device may also serve simultaneously for collecting the mud carried along by the fresh solution. The inclusion of the mud collector thus admits of the production of better, purer salt without specially preliminarily purifying the solution.

It is to be understood that the described apparatus may also be constructed as a multiple apparatus without departing from the spirit and scope of my invention.

I claim:

1. The herein described process of evaporating a solution from which salt is precipitated, consisting in forcing the solution under pressure in a continuous cycle of movement through a heater to an evaporator, and thence through the latter back to the former, in maintaining in the heater and in the pipe connecting the same with the evaporator such a high degree of pressure as to effect evaporation of the solution and precipitation of the salt exclusively in said evaporator, and in retarding the velocity of the solution during its passage through said connecting pipe to permit the precipitation of impurities in the solution and the collection of such impurities at the point where precipitation takes place.

2. The herein-described process of evaporating a solution from which salt is precipitated, comprising a continuous cycle of operations which include the pumping of the solution into the heater through a pipe at a velocity of more than 0.8 meters per second, the passing of the solution from the heater through a connecting pipe having a wide vessel included therein into the evaporator, and the pumping of the solution from the evaporator back through the first-named pipe into said heater, whereby the degree of pressure in the heater and the second-named pipe is maintained so high as to effect evaporation of the solution and precipitation of the salt exclusively in said evaporator, the passage of the solution through said vessel serving to reduce its velocity to an extent sufficient to permit the precipitation of impurities in said solution and the collection of such impurities at the point where precipitation takes place.

In testimony that I claim the foregoing as my invention I have signed my name in presence of two subscribing witnesses.

BERTHOLD BLOCK.

Witnesses:
   H. Gatzka,
   L. Schindler.